United States Patent
Abe et al.

(10) Patent No.: US 7,550,233 B2
(45) Date of Patent: Jun. 23, 2009

(54) NONAQUEOUS ELECTROLYTIC SOLUTION CONTAINING KETONE COMPOUND AND LITHIUM SECONDARY BATTERY

(75) Inventors: Koji Abe, Ube (JP); Motoki Yuguchi, Ube (JP); Yasuo Matsumori, Ube (JP); Kazuhiro Miyoshi, Ube (JP)

(73) Assignee: UBE Industries, Ltd., Ube-Shi, Yamaguchi (JP)

( * ) Notice: Subject to any disclaimer, the term of this patent is extended or adjusted under 35 U.S.C. 154(b) by 347 days.

(21) Appl. No.: 10/472,202

(22) PCT Filed: Mar. 22, 2002

(86) PCT No.: PCT/JP02/02787

§ 371 (c)(1),
(2), (4) Date: Sep. 22, 2003

(87) PCT Pub. No.: WO02/075836

PCT Pub. Date: Sep. 26, 2002

(65) Prior Publication Data

US 2004/0096748 A1 May 20, 2004

(30) Foreign Application Priority Data

Mar. 21, 2001 (JP) .................. 2001-080464
Jan. 24, 2002 (JP) .................. 2002-015189

(51) Int. Cl.
*H01M 6/16* (2006.01)
(52) U.S. Cl. ............... 429/324; 429/326; 429/341
(58) Field of Classification Search ........... 429/324, 429/326, 327, 336, 341, 231.8; 252/62.2
See application file for complete search history.

(56) References Cited

U.S. PATENT DOCUMENTS

| | | | | |
|---|---|---|---|---|
| 3,796,605 A | * | 3/1974 | Dechenaux et al. | 429/335 |
| 3,796,606 A | * | 3/1974 | Dechenaux et al. | 429/94 |
| 5,576,398 A | * | 11/1996 | Takahashi et al. | 525/528 |
| 5,804,613 A | * | 9/1998 | Beall et al. | 523/200 |
| 5,919,440 A | * | 7/1999 | Kaiser et al. | 424/76.4 |
| 2002/0169090 A1 | * | 11/2002 | Foley et al. | 510/218 |
| 2003/0120106 A1 | * | 6/2003 | Yamaguchi et al. | 560/220 |

FOREIGN PATENT DOCUMENTS

| | | | |
|---|---|---|---|
| JP | 01 286263 A | | 11/1989 |
| JP | 02-090473 | * | 3/1990 |
| JP | 2001-043867 | | 2/2001 |
| JP | 2001 176550 A | | 6/2001 |
| JP | 2001 176551 A | | 6/2001 |
| JP | 2002 222663 A | | 8/2002 |
| SU | 518811 | * | 6/1976 |
| SU | 518811 | | 10/1976 |
| WO | WO 99/44247 A | | 9/1999 |

OTHER PUBLICATIONS

Abstract of SU 518811, Novos, "Organic Binder for electrolytic capacitors- containing camphor", Novos Radio WKS, abstract.*
Supplementary European Search Report dated Jan. 19, 2007.

* cited by examiner

*Primary Examiner*—Raymond Alejandro
(74) *Attorney, Agent, or Firm*—Nixon Peabody LLP; Jeffrey L. Costellia

(57) ABSTRACT

A non-aqueous electrolytic solution containing a ketone compound having the formula (I):

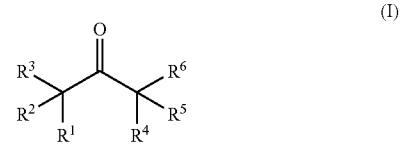

in which each of $R^1$ and $R^2$ is linear or branched alkyl; and each of $R^3$, $R^4$, $R^5$ and $R^6$ is hydrogen or linear or branched alkyl; however, $R^1$ and $R^4$ can be combined to form a cycloalkanone ring in conjunction with a propanone skeleton to which $R^1$ and $R^4$ are connected, and two or more of alkyl of $R^2$, alkyl of $R^5$, a branched chain of alkyl of $R^1$, and a branched chain of alkyl of $R^4$ can be combined to form a cycloalkane ring, or alkyl of $R^1$ and alkyl of $R^2$ and/or alkyl of $R^4$ and alkyl of $R^5$ can be combined to each other to form a cycloalkane ring, is favorably employed for manufacturing a lithium secondary battery that is excellent in the battery performances and cycle performance.

12 Claims, No Drawings

NONAQUEOUS ELECTROLYTIC SOLUTION CONTAINING KETONE COMPOUND AND LITHIUM SECONDARY BATTERY

FIELD OF THE INVENTION

The present invention relates to a lithium secondary battery showing excellent performances in safety under the overcharge conditions, cycle performance, electric capacity and storage endurance, and further to a non-aqueous electrolytic solution favorably employable for preparing the lithium secondary battery.

BACKGROUND OF THE INVENTION

Recently, a lithium secondary battery is generally employed as an electric source for driving small electronic devices. The lithium secondary battery mainly comprises a positive electrode, a non-aqueous electrolytic solution, and a negative electrode. The non-aqueous lithium secondary battery preferably employs a positive electrode of lithium complex oxide such as $LiCoO_2$ and a negative electrode of carbonaceous material or lithium metal. The non-aqueous electrolytic solution for the lithium secondary battery preferably employs carbonate compounds such as ethylene carbonate (EC), propylene carbonate (PC), dimethyl carbonate (DMC), diethyl carbonate (DEC), and methyl ethyl carbonate (MEC).

Nevertheless, it is desired to provide a secondary battery having more excellent performances in the cycle performance and electric capacity.

In the lithium secondary battery using a positive electrode of $LiCoO_2$, $LiMn_2O_4$, or $LiNiO_2$, oxidative decomposition of a portion of a solvent of the non-aqueous electrolytic solution takes place in the electric charging stage. The decomposition product disturbs electrochemical reaction of the battery so that the battery performance lowers. It is considered that the oxidative decomposition occurs in the solvent on the interface between the positive electrode and the non-aqueous electrolytic solution. Therefore, the battery performances such as cycle performance and electric capacity are not satisfactory for batteries to be repeatedly charged and discharged at a maximum working voltage exceeding 4.1 V.

Moreover, in the lithium secondary battery using particularly a negative electrode of carbonaceous material of high crystallinity such as natural graphite or artificial graphite, reductive decomposition of the solvent of the non-aqueous electrolytic solution takes place on the surface of the negative electrode in the charging stage. The reductive decomposition on the negative electrode takes place after repeated charging-discharging procedures even in the case of using EC which is generally employed in the non-aqueous electrolytic solution.

Accordingly, the battery performances such as cycle performance and electric capacity are at present considered to be not satisfactory.

When the lithium secondary battery is so overcharged as exceeding an ordinary working voltage, an excessive amount of lithium is released from the positive electrode, while an excessive amount of lithium produces dendrite on the negative electrode. Therefore, both of the positive electrode and negative electrode become chemically unstable. When both of the positive electrode and negative electrode become chemically unstable, the carbonate in the non-aqueous electrolytic solution rapidly decomposes under exothermic reaction. The rapid exothermic reaction causes abnormal heat production of the battery and impairs safety of the battery. These problems become more serious, as the energy density of the lithium secondary battery increases. However, at present, the safety in keeping the battery from overcharging and the battery performances such as cycle performance, electric capacity and storage endurance are still not satisfactory.

The present invention has an object to provide a lithium secondary battery that is so free from the above-mentioned problems as to be excellent in the safety in overcharging and further in battery performances such as cycle performance, electric capacity and storage endurance under the charged conditions, and to provide a novel non-aqueous electrolytic solution favorably employable for the preparation of the lithium secondary battery.

DISCLOSURE OF INVENTION

The present invention relates to a non-aqueous electrolytic solution comprising an electrolyte dissolved in a non-aqueous solvent, characterized in that the non-aqueous electrolytic solution contains at least one ketone compound having the formula (I):

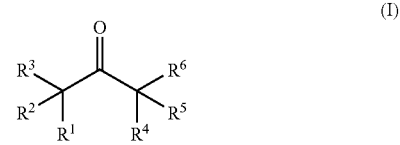

(I)

[in the formula, each of $R^1$, $R^2$, $R^3$, $R^4$, $R^5$, and $R^6$ independently represents a hydrogen atom or an alkyl group having 1-12 carbon atoms; or $R^1$, $R^2$, $R^3$, $R^4$, $R^5$, and $R^6$ are combined together to form a cycloalkanone having 4-16 carbon atoms; provided that a total number of hydrogen atoms for $R^1$, $R^2$ and $R^3$ is 0 or 1] and to a lithium secondary battery employing the non-aqueous electrolytic solution.

In more detail, the present invention resides in a non-aqueous electrolytic solution for lithium secondary batteries comprising an electrolyte dissolved in a non-aqueous solvent, which further contains a ketone compound having the above-mentioned formula (I) [wherein each of $R^1$ and $R^2$ independently represents a linear or branched alkyl group having 1-12 carbon atoms; and each of $R^3$, $R^4$, $R^5$ and $R^6$ independently represents a hydrogen atom or a linear or branched alkyl group having 1-12 carbon atoms; provided that $R^1$ and $R^4$ can be combined to form a cycloalkanone ring having a ring-constituting 4-16 carbon atoms in conjunction with a propanone skeleton to which $R^1$ and $R^4$ are connected, that two or more of an alkyl group of $R^2$, an alkyl group of $R^5$, a branched chain of an alkyl group of $R^1$, and a branched chain of an alkyl group of $R^4$ can be combined to form a cycloalkane ring having a ring-constituting 4-16 carbon atoms, or that an alkyl group of $R^1$ and an alkyl group of $R^2$ and/or an alkyl group of $R^1$ and an alkyl group of $R^5$ can be combined to each other to form a cycloalkane ring having a ring-constituting 3-16 carbon atoms] and a lithium secondary battery using the non-aqueous electrolytic solution.

As examples of the ketone compounds employed in the invention, the following ketone compounds are mentioned:

(1) A ketone compound in which each of $R^1$ and $R^2$ independently is a linear or branched alkyl group having 1 to 6 carbon atoms.

(2) A ketone compound in which $R^1$ and $R^4$ are combined to form a cycloalkanone ring having a ring-constituting 4-8 carbon atoms in conjunction with a propanone skeleton to which $R^1$ and $R^4$ are connected (it is preferred that the ketone compound has 2 to 6 substituents on the cycloalkanone ring).

(3) A ketone compound in which $R^1$ and $R^4$ are combined to form a cycloalkanone ring having a ring-constituting 4-8 carbon atoms in conjunction with a propanone skeleton to which $R^1$ and $R^4$ are connected, and further in which two or more of an alkyl group of $R^2$, an alkyl group of $R^5$, a branched chain of an alkyl group of $R^1$, and a branched chain of an alkyl group of $R^4$ are combined to form 1 to 3 cycloalkane rings having a ring-constituting 4-8 carbon atoms.

(4) A ketone compound showing optical isomerism or stereoisomerism.

Heretofore, there are known the following preventing mechanisms for overcharge in the lithium secondary battery: a method of performing redox shuttle at a potential of approx. 4.5 V (JP-A-7-302,614); a method of causing polymerization at a potential of 4.5 V or lower so as to increase an internal resistance of battery (JP-A-9-106,835); and a method of producing a gas to operate an internal electric switch-off device so as to form an internal shortage, or producing an electroconductive polymer so as to form an internal shortage, whereby ensuring the safety of battery under overcharged conditions (JP-A-9-171,840, and JP-A-10-321,258).

In contrast, the mechanism of preventing overcharge of a lithium secondary battery of the invention is considered as follows:

The aforementioned ketone compound contained in the non-aqueous electrolytic solution reacts with a lithium metal deposited on the negative electrode under the overcharged condition to form a passive material coat on the negative electrode so that the active lithium metal is inactivated and then further production of active lithium metal is suppressed due to increase of resistance at the negative electrode. Thus, the safety of battery is ensured.

Further, in the case that the ketone compound contained in the non-aqueous electrolytic solution has a relatively low oxidation potential, the ketone compound is electrochemically oxidized on the positive electrode under the overcharged condition to produce a cation, and the cation moves to the negative electrode on which the cation reacts with the lithium metal deposited on the negative electrode so that a passive material coat is formed on the negative electrode. As a result, the active lithium metal is inactivated, and further production of an active lithium metal is suppressed by increase of resistance on the negative electrode, whereby the safety of battery is ensured.

Moreover, since the aforementioned ketone compound contained in the non-aqueous electrolytic solution has such a high oxidation voltage as +4.5 V to +5.2 V (voltage relative to the oxidation voltage of lithium), the solvent of the electrolytic solution does not decompose even when the voltage locally exceeds 4.2 V in the case that the charge-discharge operation is produced at such a high temperature as 40° C. or higher or at a normal working voltage. Further, the ketone compound decomposes by reduction on the negative electrode to form a stable thin coat on the negative electrode. For these reasons, a lithium secondary battery having not only excellent battery safety under the overcharged condition but also excellent battery performances such as cycle performance, electric capacity and storage endurance can be provided.

In the formula (I), $R^1$ and $R^2$ independently represents a linear or branched alkyl group having 1-12 carbon atoms; and $R^3$ represents a hydrogen atom or a linear or branched alkyl group having 1-12 carbon atoms. Examples of the alkyl groups include linear alkyl groups such as methyl, ethyl, propyl, butyl, pentyl, hexyl, and dodecyl and branched alkyl groups such as isopropyl, isobutyl, sec-butyl, tert-butyl and 1,1-dimethylpropyl.

Each of $R^4$, $R^1$ and $R^6$ independently represents a hydrogen atom or a linear or branched alkyl group having 1-12 carbon atoms. Examples of the alkyl groups include linear alkyl groups such as methyl, ethyl, propyl, butyl, pentyl, hexyl, and dodecyl and branched alkyl groups such as isopropyl, isobutyl, sec-butyl, tert-butyl and 1,1-dimethylpropyl.

Further, $R^1$ and $R^4$ can be combined to each other to form a cycloalkanone ring having 4-16 carbon atoms. Examples of the cycloalkanone ring having 4-16 carbon atoms include cyclobutanone, cyclopentanone, cyclohexanone, cycloheptanone, cyclododecanone, cyclooctanone, cyclononanone, and their bicyclo and tricyclo compounds.

Examples of the ketone compounds of the formula (I) include 3-methyl-2-butanone, 2-methyl-3-pentanone, 2,4-dimethyl-3-pentanone, 3-methyl-2-pentanone, 4-methyl-3-hexanone, 3,5-dimethyl-4-heptanone, 3,3-dimethyl-2-pentanone, pinacoline, 2,2-dimethyl-3-pentanone, 2,2,4-trimethyl-3-pentanone, 2,2,4,4-tetramethyl-3-pentanone, 3,4-dimethyl-2-pentanone, 3,5-dimethyl-2-hexanone, 3,4-dimethyl-2-hexanone, 3-isopropyl-2-heptanone, 2,4-dimethylcyclobutanone, 2,2,4,4-tetramethylcyclobutanone, 2,5-dimethylcyclopentanone, 2,2,5,5-tetramethylcyclopentanone, (−)-thujone, 2,6-dimethylcyclohexanone, 2,2,6,6-tetramethylcyclohexanone, 2,6-di-tert-butylcyclohexanone, 2,6-di-sec-butylcyclohexanone, 2-sec-butylcyclohexanone, (−)-menthone, (+)-menthone, (±)-menthone, isomenthone, (−)-camphor, (+)-camphor, (±)-camphor, (+)-nopinone, 2,7-dimethylcycloheptanone, 2,2,7,7-tetramethylcycloheptanone, (−)-fenchone, (+)-fenchone, (±)-fenchone, and 2-adamantanone. The ketone compounds can be employed singly or in optional combinations of two or more compounds.

$R^3$ of the ketone compound of the formula (I) is either a hydrogen atom or an alkyl group. They are concretely classified in the following manner.

(1) Compounds in which $R^3$ is not a Hydrogen Atom (1-1) Examples of the compounds in which all of $R^4$, $R^1$, and $R^6$ are alkyl groups include cyclic ketone compounds such as the aforementioned 2,2,4,4-tetramethylcyclobutanone, 2,2,5,5-tetramethylcyclopentanone, 2,2,6,6-tetramethylcyclohexanone, 2,2,7,7-tetramethylcycloheptanone, (−)-fenchone, (+)-fenchone, and (±)-fenchone, and acyclic ketone compounds such as the aforementioned 2,2,4,4-tetramethyl-3-pentanone.

(1-2) Examples of the compounds in which one of $R^4$, $R^5$ and $R^6$ is a hydrogen atom include acyclic ketone compounds such as the aforementioned 2,2,4-trimethyl-3-pentanone and cyclic ketone compounds such as 2,2,5-trimethylcyclopetanone and 2,2,6-trimethylcyclohexanone.

(1-3) Examples of the compounds in which two of $R^4$, $R^5$ and $R^6$ are hydrogen atoms include cyclic ketone compounds such as the aforementioned (−)-camphor, (+)-camphor, and (±)-camphor, and acyclic ketone compounds such as the aforementioned 2,2-dimethyl-3-pentanone.

(1-4) Examples of the compounds in which all of $R^4$, $R^5$ and $R^6$ are hydrogen atoms include acyclic ketone compounds such as the aforementioned 3,3-dimethyl-2-pentanone and pinacoline, and cyclic ketone compounds such as methyl-1-methylcyclopropyl ketone and 1-acetyladamantane.

(2) Compounds in which $R^3$ is a Hydrogen Atom (2-1). Examples of the compounds in which one of $R^4$, $R^5$ and $R^6$ is a hydrogen atom include cyclic ketone compounds such as the aforementioned 2,4-dimethylcyclobutanone, 2,5-dimethylcyclopentanone, (−)-thujone, 2,6-dimethylcyclohexanone, 2,6-di-tert-butylcyclohexanone, 2,6-di-sec-butylcyclohexanone, 2,7-dimethylcycloheptanone and 2-adamantanone, dicyclopropyl ketone, and dicyclohexyl ketone, and acyclic ketone compounds such as the aforementioned 2,4-dimethyl-3-pentanone and 3,5-dimethyl-4-heptanone.

(2-2) Examples of the compounds in which two of $R^4$, $R^5$ and $R^6$ are hydrogen atoms include cyclic ketone compounds such as the aforementioned 2-sec-butylcyclohexanone, (−)-menthone, (+)-menthone, (±)-menthone, isomenthone, and (+)-nopinone, and acyclic ketone compounds such as the aforementioned 2-methyl-3-pentanone and 4-methyl-3-hexanone.

(2-3) Examples of the compounds in which all of $R^4$, $R^5$ and $R^6$ are hydrogen atoms include acyclic ketone compounds such as the aforementioned 3-methyl-2-butanone, 3,4-dimethyl-2-pentanone, 3,5-dimethyl-2-hexanone, 3,4-dimethyl-2-hexanone, 3-isopropyl-2-heptanone, and 3-methyl-2-pentanone.

If the amount of a ketone compound of the formula (I) in the non-aqueous electrolytic solution is excessively large, the battery performance may be impaired. If the amount is too small, the expected battery performance cannot be obtained. Accordingly, the amount is in the range of 0.1 to 20 wt. %, preferably 0.2 to 10 wt. %, more preferably 0.5 to 5 wt. %, from the viewpoint of increase of the cycle performance.

Examples of the non-aqueous solvents include cyclic carbonates such as ethylene carbonate (EC), propylene carbonate (PC), butylene carbonate (BC), and vinylene carbonate (VC), lactones such as γ-butyrolactone, linear carbonates such as dimethyl carbonate (DMC), methyl ethyl carbonate (MEC), and diethyl carbonate (DEC), ethers such as tetrahydrofuran, 2-methyltetrahydrofuran, 1,4-dioxane, 1,2-dimethoxyethane, 1,2-diethoxyethane, and 1,2-dibutoxyethane, nitriles such as acetonitrile, esters such as methyl propionate, methyl pivalate and octyl pivalate, and amides such as dimethylformamide.

The solvents can be used singly or in combinations of two or more. There are no specific limitations with respect to the combinations of the non-aqueous solvents. For instance, there can be mentioned a combination of a cyclic carbonate and a linear carbonate, a combination of a cyclic carbonate and a lactone, and a combination of three cyclic carbonates and a linear carbonate.

In order to enhance the overcharge preventing effect, the non-aqueous electrolytic solution can be mixed with 0.1-5 wt. % of at least one organic compound selected from biphenyl, 4-methylbiphenyl, 4-ethylbiphenyl, o-terphenyl, m-terphenyl, p-terphenyl, and cyclohexylbenzene.

Examples of the electrolytes include $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$. The electrolytes can be employed singly or in combinations of two ore more. Generally, the electrolyte can be dissolved in the non-aqueous solvent in such an amount to give an electrolytic solution of 0.1 M to 3 M, preferably 0.5 M to 1.5 M.

The electrolytic solution of the invention can be obtained by mixing the non-aqueous solvents, dissolving the electrolyte in the mixture, and dissolving a ketone compound of the formula (I).

The electrolytic solution of the invention can be favorably employed as a component material of a secondary battery, especially a lithium secondary battery. There are no specific limitations with respect to other component materials of the secondary battery, and various conventional component materials can be employed.

For instance, the positive electrode active material can be a complex metal oxide of lithium and cobalt or nickel. The positive electrode active materials can be used singly or in combinations of two or more. Examples of the complex metal oxides include $LiCoO_2$, $LiNiO_2$ and $LiCO_{1-x}Ni_xO_2$ (0.01<x<1). Further, a mixture of $LiCoO_2$ and $LiMn_2O_4$, a mixture of $LiCoO_2$ and $LiNiO_2$, and a mixture of $LiMn_2O_4$ and $LiNiO_2$ can be used.

The positive electrode can be prepared by kneading the above-mentioned positive electrode active material with an electroconductive agent such as acetylene black or carbon black, a binder such as poly(tetrafluoroethylene) (PTFE), poly(vinylidene fluoride) (PVDF), styrenebutadiene copolymer (SBR), acrylonitrile-butadiene copolymer (NBR) or carboxymethylcellulose (CMC), and a solvent, to give a positive electrode material composition; coating the composition on a collector such as aluminum foil or stainless steel lath plate; drying the coated composition; pressing it for molding, and heating the molded product at a temperature of approx. 50° C. to 250° C., under vacuum, for approx. 2 hours.

As a negative electrode active material, a lithium metal, a lithium alloy, a carbonaceous material having a graphite-type crystalline structure which can absorb and release lithium [thermally decomposed carbonaceous material, coke, graphite (e.g., artificial graphite and natural graphite), fired organic polymer material, and carbon fiber], or a complex tin oxide. Preferred is a carbonaceous material having a graphite-type crystalline structure in which the lattice distance of lattice surface (002), namely, $d_{002}$, is 0.335-0.340 nm. The negative electrode active materials can be used singly or in combination with two or more.

The negative electrode active material in the powdery form such as carbonaceous powder is preferably used in combination with a binder such as ethylene propylene diene terpolymer (EPDM), poly(tetrafluoroethylene) (PTFE), poly(vinylidene fluoride) (PVDF), styrene-butadiene copolymer (SBR), acrylonitrile-butadiene copolymer (NBR) or carboxymethylcellulbse (CMC), to give a negative electrode material composition. There are no limitations with respect to the preparation of the negative electrode, and the negative electrode can be prepared by a process similar to the aforementioned process for preparing the positive electrode.

There are no specific limitations with respect to the structure of the lithium secondary battery of the invention. For instance, the non-aqueous secondary battery can be a battery of coin type comprising a single-layered or multi-layered positive electrode, a negative electrode, and a separator; a polymer battery; or a cylindrical or prismatic battery comprising a positive electrode roll, a negative electrode roll, and a separator roll. The separator can be a known microporous polyolefin film, woven fabric, or non-woven fabric.

EXAMPLE 1

1) Preparation of Non-Aqueous Electrolytic Solution

In a non-aqueous mixture of EC:MEC [30:70, volume ratio] was dissolved $LiPF_6$ to give a non-aqueous electrolytic solution of 1 M concentration. To the electrolytic solution was added (−)-fenchone in an amount of 1.0 wt. % (based on the amount of the electrolytic solution).

2) Preparation of Lithium Secondary Battery and Measurement of its Battery Performances LiCoO$_2$ (positive electrode active material, 80 wt. %), acetylene black (electro-conductive material, 10 wt. %), and poly(vinylidene fluoride) (binder, 10 wt. %) were mixed. To the resulting mixture was further added 1-methyl-2-pyrrolidone (solvent). Thus produced positive electrode mixture was coated on aluminum foil, dried, molded under pressure, and heated to give a positive electrode.

An artificial graphite (negative electrode active material, 90 wt. %) and poly(vinylidene fluoride) (binder, 10 wt. %) were mixed. The resulting mixture was further mixed with 1-methyl-2-pyrrolidone (solvent). Thus produced negative electrode mixture was coated on copper foil, dried, molded under pressure, and heated to give a negative electrode.

The positive and negative electrodes, a microporous polypropylene film separator, and the non-aqueous electrolytic solution were combined to give a coin-type battery (diameter: 20 mm, thickness: 3.2 mm).

The coin-type battery was charged at room temperature (20° C.) with a constant electric current (0.8 mA, per electrode area) to reach 4.2 V and then the charging was continued under a constant voltage of 4.2 V. The charging was performed for 5 hours. Subsequently, the battery was discharged to give a constant electric current (0.8 mA). The discharge was continued to give a terminal voltage of 2.7 V. The charge-discharge cycle was repeated.

The initial discharge capacity was 1.03 times as much as that measured in a battery using a non-aqueous electrolytic solution comprising a solvent mixture of EC/MEC (30/70, volume ratio) and 1M LiPF$_6$ but no ketone compound) [see Comparison Example 1].

After the 50 cycle charge-discharge procedure was complete, the battery performances were measured. The discharge capacity was 92.4% of the initial discharge capacity (100%).

The coin-type battery was further subjected to another 50 cycle charge-discharge procedures, and then subjected to a overcharging test by continuing the charging at room temperature (20° C.) at a constant current of 0.8 mA from the fully-charged state. After the overcharging test, a lithium on the negative electrode was inactivated, and was gray. The low temperature performance was also good.

The preparation and performances of the coin-type battery are set forth in Table 1.

EXAMPLE 2

The procedures of Example 1 were repeated except that (−)-fenchone was employed for the electrolytic solution in an amount of 0.5 wt. %, to prepare a coin-type battery.

A battery performance after 50 cycles was measured. The discharge capacity retention was 85.9%. After the overcharging test, a lithium on the negative electrode was inactivated, and was gray.

The preparation and performances of the coin-type battery are set forth in Table 1.

EXAMPLE 3

The procedures of Example 1 were repeated except that (−)-fenchone was employed for the electrolytic solution in an amount of 3.0 wt. %, to prepare a coin-type battery.

A battery performance after 50 cycles was measured. The discharge capacity retention was 90.3%. After the overcharging test, a lithium on the negative electrode was inactivated, and was gray.

The preparation and performances of the coin-type battery are set forth in Table 1.

EXAMPLE 4

The procedures of Example 1 were repeated except that (−)-fenchone was employed for the electrolytic solution in an amount of 5.0 wt. %, to prepare a coin-type battery.

A battery performance after 50 cycles was measured. The discharge capacity retention was 88.1%. After the overcharging test, a lithium on the negative electrode was inactivated, and was gray.

The preparation and performances of the coin-type battery are set forth in Table 1.

EXAMPLE 5

The procedures of Example 1 were repeated except that pinacoline was employed for the electrolytic solution in an amount of 1.0 wt. %, to prepare a coin-type battery.

A battery performance after 50 cycles was measured. The discharge capacity retention was 97.2%. After the overcharging test, a lithium on the negative electrode was inactivated, and was gray.

The preparation and performances of the coin-type battery are set forth in Table 1.

EXAMPLE 6

The procedures of Example 1 were repeated except that 2,4-dimethyl-3-pentanone was employed for the electrolytic solution in an amount of 2.0 wt. %, to prepare a coin-type battery.

A battery performance after 50 cycles was measured. The discharge capacity retention was 95.0%. After the overcharging test, a lithium on the negative electrode was inactivated, and was gray.

The preparation and performances of the coin-type battery are set forth in Table 1.

EXAMPLE 7

The procedures of Example 1 were repeated except that 2,2,4,4-tetramethyl-3-pentanone was employed for the electrolytic solution in an amount of 1.0 wt. %, to prepare a coin-type battery.

A battery performance after 50 cycles was measured. The discharge capacity retention was 85.6%. After the overcharging test, a lithium on the negative electrode was inactivated, and was gray.

The preparation and performances of the coin-type battery are set forth in Table 1.

EXAMPLE 8

The procedures of Example 1 were repeated except that 3-isopropyl-2-heptanone was employed for the electrolytic solution in an amount of 2.0 wt. %, to prepare a coin-type battery.

A battery performance after 50 cycles was measured. The discharge capacity retention was 96.4%. After the overcharging test, a lithium on the negative electrode was inactivated, and was gray.

The preparation and performances of the coin-type battery are set forth in Table 1.

EXAMPLE 9

The procedures of Example 1 were repeated except that 2-adamantanone was employed for the electrolytic solution in an amount of 1.0 wt. %, to prepare a coin-type battery.

A battery performance after 50 cycles was measured. The discharge capacity retention was 85.3%. After the overcharging test, a lithium on the negative electrode was inactivated, and was gray.

The preparation and performances of the coin-type battery are set forth in Table 1.

EXAMPLE 10

The procedures of Example 1 were repeated except that (−)-menthone was employed for the electrolytic solution in an amount of 1.0 wt. %, to prepare a coin-type battery.

A battery performance after 50 cycles was measured. The discharge capacity retention was 88.5%. After the overcharging test, a lithium on the negative electrode was inactivated, and was gray.

The preparation and performances of the coin-type battery are set forth in Table 1.

EXAMPLE 11

The procedures of Example 1 were repeated except that (−)-camphor was employed for the electrolytic solution in an amount of 1.0 wt. %, to prepare a coin-type battery.

A battery performance after 50-cycles was measured. The discharge capacity retention was 93.7%. After the overcharging test, a lithium on the negative electrode was inactivated, and was gray.

The preparation and performances of the coin-type battery are set forth in Table 1.

EXAMPLE 12

The procedures of Example 1 were repeated except that $LiPF_6$ was dissolved in a non-aqueous mixture of EC:DEC [30:70, volume ratio] to give a non-aqueous electrolytic solution of 1 M concentration and that (+)-fenchone was employed for the electrolytic solution in an amount of 1.0 wt. %, to prepare a coin-type battery.

A battery performance after 50 cycles was measured. The discharge capacity retention was 92.6%. After the overcharging test, a lithium on the negative electrode was inactivated, and was gray.

The preparation and performances of the coin-type battery are set forth in Table 1.

EXAMPLE 13

The procedures of Example 1 were repeated except that $LiPF_6$ was dissolved in a non-aqueous mixture of EC:DEC [30:70, volume ratio] to give a non-aqueous electrolytic solution of 1 M concentration and that (+)-camphor was employed for the electrolytic solution in an amount of 1.0 wt. %, to prepare a coin-type battery.

A battery performance after 50 cycles was measured. The discharge capacity retention was 93.6%. After the overcharging test, a lithium on the negative electrode was inactivated, and was gray.

The preparation and performances of the coin-type battery are set forth in Table 1.

COMPARISON EXAMPLE 1

In a non-aqueous mixture of EC:MEC [30:70, volume ratio] was dissolved $LiPF_6$ to give a non-aqueous electrolytic solution of 1 M concentration. To the electrolytic solution was added no ketone compound.

The procedures of Example 1 were repeated except for employing the above-mentioned electrolytic solution, to prepare a coin-type battery. A battery performance was then measured.

The discharge capacity retention after the 50 cycle test was 82.6%. After the overcharging test, a lithium on the negative electrode was not inactivated, and dendrite deposited on the electrode. The preparation and performances of the coin-type battery are set forth in Table 1.

COMPARISON EXAMPLE 2

The procedures of Example 1 were repeated except that acetone was employed for the electrolytic solution in an amount of 1.0 wt. %, to prepare a coin-type battery.

A battery performance was measured. The discharge capacity retention after the 50 cycle test was 1.1%.

The preparation and performances of the coin-type battery are set forth in Table 1.

COMPARISON EXAMPLE 3

The procedures of Example 1 were repeated except that cyclohexanone was employed for the electrolytic solution in an amount of 1.0 wt. %, to prepare a coin-type battery. A battery performance was measured. The discharge capacity retention after the 50 cycle test was 0.4%. The preparation and performances of the coin-type battery are set forth in Table 1.

EXAMPLE 14

The procedures of Example 1 were repeated except that the non-aqueous electrolytic solution was replaced with 1 M $LiPF_6$-EC/PC/MEC/DMC (30/5/50/15, volume ratio] and that $LiCoO_2$ (positive electrode active material) was replaced with $LiNi_{0.8}CO_{0.2}O_2$, to prepare a coin-type battery.

A battery performance after 50 cycles was measured. The discharge capacity retention was 91.1%. After the overcharging test, a lithium on the negative electrode was inactivated, and was gray.

The preparation and performances of the coin-type battery are set forth in Table 1.

EXAMPLE 15

The procedures of Example 1 were repeated except that the non-aqueous electrolytic solution was replaced with 1 M $LiBF_4$-EC/PC/DEC/DMC (30/5/30/35, volume ratio] and that $LiCoO_2$ (positive electrode active material) was replaced with $LiMn_2O_4$, to prepare a coin-type battery.

A battery performance after 50 cycles was measured. The discharge capacity retention was 92.5%. After the overcharging test, a lithium on the negative electrode was inactivated, and was gray.

The preparation and performances of the coin-type battery are set forth in Table 1.

TABLE 1

|  | Compound (wt. %) | | Initial discharge capacity (R.V.) | Discharge capacity retention (%) |
|---|---|---|---|---|
| Ex. 1 | (−)-fenchone | (1.0) | 1.03 | 92.4 |
| Ex. 2 | (−)-fenchone | (0.5) | 1.01 | 85.9 |
| Ex. 3 | (−)-fenchone | (3.0) | 1.02 | 90.3 |
| Ex. 4 | (−)-fenchone | (5.0) | 0.98 | 88.1 |
| Ex. 5 | pinacoline | (1.0) | 1.00 | 97.2 |
| Ex. 6 | 2,4-dimethyl-pentanone | (2.0) | 0.97 | 95.0 |
| Ex. 7 | 2,2,4,4-tetramethyl-3-pentanone | (1.0) | 1.01 | 85.6 |
| Ex. 8 | 3-isopropyl-2-heptanone | (2.0) | 0.93 | 96.4 |
| Ex. 9 | 2-adamantanone | (1.0) | 0.96 | 85.3 |
| Ex. 10 | (−)-menthone | (1.0) | 1.01 | 88.5 |
| Ex. 11 | (−)-camphor | (1.0) | 1.02 | 93.7 |
| Ex. 12 | (+)-fenchone | (1.0) | 1.02 | 92.6 |
| Ex. 13 | (+)-camphor | (1.0) | 1.01 | 93.6 |
| Com. 1 | none | | 1.00 | 82.6 |
| Com. 2 | acetone | (1.0) | 0.82 | 1.1 |
| Com. 3 | cyclohexanone | (1.0) | 0.83 | 0.4 |
| Ex. 14 | (−)-fenchone | (1.0) | 1.06 | 91.1 |
| Ex. 15 | (−)-fenchone | (1.0) | 0.99 | 92.5 |

Remarks:

Positive electrode: LiCoO$_2$ for Examples 1-13 and Comparison Examples 1-3; LiNi$_{0.8}$CO$_{0.2}$O$_2$ for Example 14: and LiMn$_2$O$_4$ for Example 15.

Negative electrode: artificial graphite for all

EXAMPLES AND COMPARISON EXAMPLES

Electrolytic solution: 1M LiPF$_6$-EC/MEC=30/70 (volume ratio) for Examples 1-11 and Comparison Examples 1-3; 1M LiPF$_6$-EC/DEC=30/70 (volume ratio) for Examples 12 and 13; 1M LiPF$_6$-EC/PC/MEC/DMC=30/5/50/15 (volume ratio) for Example 14; and 1M LiBF$_4$ EC/PC/DEC/DMC=30/5/30/35 (volume ratio) for Example 15.

R.V.: Relative Value.

The chemical formulas of (−)-fenchone, pinacoline, 2,4-dimethyl-3-pentanone, 2,2,4,4-tetramethyl-3-pentanone, 3-isopropyl-2-heptanone, 2-adamantanone, (−)-menthone, (−)-camphor, and (+)-camphor are described below:

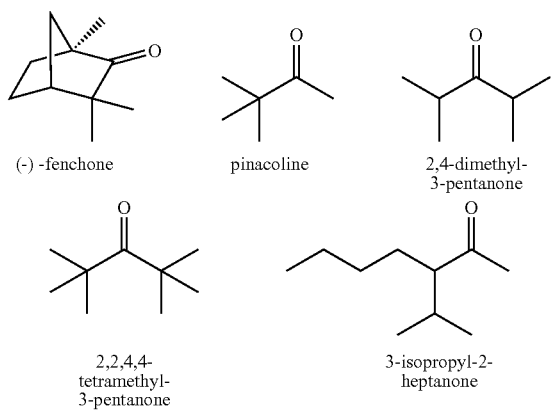

(−)-fenchone   pinacoline   2,4-dimethyl-3-pentanone 2,2,4,4-tetramethyl-3-pentanone   3-isopropyl-2-heptanone

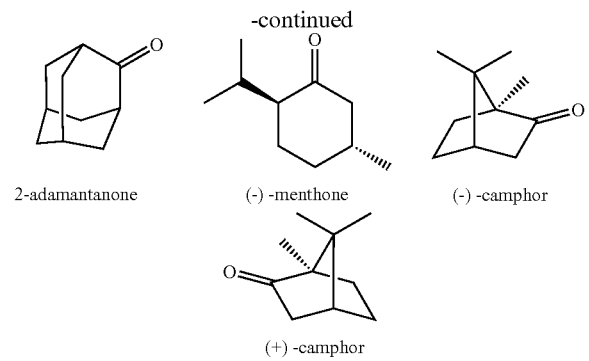

2-adamantanone   (−)-menthone   (−)-camphor (+)-camphor

The present invention is not limited to the above-mentioned examples, and various combinations inferred from the gist of the invention are utilizable. Particularly, no limitations with respect to the combinations of the solvents are given by the those of Examples. Further, the present invention is applicable to batteries of cylindrical-type and prismatic-type, and polymer battery.

INDUSTRIAL UTILIZATION OF INVENTION

The present invention provides a lithium secondary battery that is excellent in battery safety and battery performances such as cycle performance, electric capacity, and storage endurance.

What is claimed is:

1. A lithium secondary battery comprising a positive electrode, a negative electrode, and an electrolyte dissolved in a non-aqueous solvent, which further contains 0.1 to 20 wt. % of a ketone compound having the formula (I):

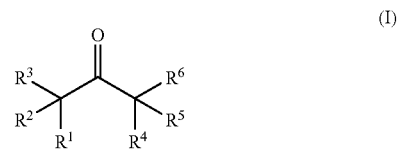

(I)

wherein each of R$^1$ and R$^2$ independently represents a linear or branched alkyl group having 1-12 carbon atoms; and each of R$^3$, R$^4$, R$^5$ and R$^6$ independently represents a hydrogen atom or a linear or branched alkyl group having 1-12 carbon atoms.

2. The lithium secondary battery of claim 1, wherein the negative electrode comprises artificial graphite as a negative electrode active material.

3. The lithium secondary battery of claim 1, wherein each of R$^1$ and R$^2$ of the formula (I) independently represents a linear or branched alkyl group having 1 to 6 carbon atoms.

4. The lithium secondary battery of claim 1, wherein the ketone compound is dimethyl-3-pentanone, 2,2,4,4-tetramethyl-3-pentanone or 3-isopropyl-2-heptanone.

5. The lithium secondary battery of claim 1, wherein the ketone compound is contained in an amount of 0.2 to 10 wt. % in the non-aqueous electrolytic solution.

6. The lithium secondary battery of claim 1, wherein the ketone compound is contained in an amount of 0.5 to 5 wt. % in the non-aqueous electrolytic solution.

7. The lithium secondary battery of claim 1, wherein the non-aqueous solvent is a mixture solvent comprising at least a cyclic carbonate and a linear carbonate.

8. A lithium secondary battery, comprising a positive electrode, a negative electrode, and an electrolyte dissolved in a non-aqueous solvent, which further contains 0.1 to 20 wt. % of a ketone compound selected from the group consisting of fenchone, pinacoline, (−)-menthone, and 2-adamantanone.

9. The lithium secondary battery of claim 8, wherein the ketone compound is fenchone.

10. The lithium secondary battery of claim 8, wherein the ketone compound is contained in an amount of 0.2 to 10 wt. % in the non-aqueous electrolytic solution.

11. The lithium secondary battery of claim 8, wherein the ketone compound is contained in an amount of 0.5 to 5 wt. % in the non-aqueous electrolytic solution.

12. The lithium secondary battery of claim 8, wherein the non-aqueous solvent is a mixture solvent comprising at least a cyclic carbonate and a linear carbonate.

* * * * *